United States Patent
He

(10) Patent No.: US 11,748,245 B2
(45) Date of Patent: Sep. 5, 2023

(54) OBJECT-ORIENTED REGRESSION-CANDIDATE FILTER

(71) Applicant: Oracle International Corporation, Redwood Shores, CA (US)

(72) Inventor: Changqin He, Beijing (CN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/047,668

(22) Filed: Jul. 27, 2018

(65) Prior Publication Data
US 2020/0034282 A1 Jan. 30, 2020

(51) Int. Cl.
*G06F 11/36* (2006.01)
*G06F 8/71* (2018.01)

(52) U.S. Cl.
CPC ............ *G06F 11/3692* (2013.01); *G06F 8/71* (2013.01); *G06F 11/3604* (2013.01)

(58) Field of Classification Search
CPC ..... G06F 11/3692; G06F 11/3604; G06F 8/71
USPC ........................................................ 717/126
See application file for complete search history.

(56) References Cited

U.S. PATENT DOCUMENTS

| | | | |
|---|---|---|---|
| 5,694,540 A | 12/1997 | Humelsine et al. | |
| 8,037,360 B2* | 10/2011 | Rusmanov | G06F 11/3696 714/38.1 |
| 8,117,598 B2* | 2/2012 | Johnson | G06F 11/3688 717/124 |
| 8,276,123 B1* | 9/2012 | Deng | G06F 11/3688 714/37 |
| 8,549,483 B1 | 10/2013 | Bridges et al. | |
| 8,954,930 B2 | 2/2015 | Kamenz et al. | |
| 9,244,814 B1* | 1/2016 | Chazan | G06F 11/3664 |
| 9,720,799 B1 | 8/2017 | Lachwani et al. | |
| 10,296,446 B2* | 5/2019 | D'Andrea | G06F 11/3688 |
| 2004/0025088 A1* | 2/2004 | Avvari | G06F 11/3676 714/38.13 |

(Continued)

OTHER PUBLICATIONS

Yoo et al, "Regression testing minimization, selection and prioritization: a survey", 2012, [Online], pp. 67-120, [Retrieved from internet on Mar. 27, 2023], <https://coinse.kaist.ac.kr/publications/pdfs/Yoo2010fk.pdf> (Year: 2012).*

(Continued)

*Primary Examiner* — S. Sough
*Assistant Examiner* — Zengpu Wei
(74) *Attorney, Agent, or Firm* — Mughal Gaudry & Franklin PC

(57) ABSTRACT

Methods and systems are disclosed providing an object-oriented regression-candidate filter to improve software build testing. A modification to a current software build may be detected. A set of objects of the current software build that are affected by the modification may be identified. A modification to a previous software build that affected a subset of the set of objects may be identified. A set of tests may be generated to include one or more tests previously executed to test the modification to the previous software build. The set of tests may be executed to test the current software build. A result of the set of tests may be compared to one or more previous test results. Based on the comparison, the modification to the current software build may be verified as operational.

20 Claims, 6 Drawing Sheets

(56) References Cited

U.S. PATENT DOCUMENTS

| | | | |
|---|---|---|---|
| 2006/0206866 A1* | 9/2006 | Eldrige | G05B 19/41845 |
| | | | 717/122 |
| 2008/0155338 A1* | 6/2008 | Rusmanov | G06F 11/3688 |
| | | | 714/38.13 |
| 2009/0089745 A1* | 4/2009 | Johnson | G06F 8/71 |
| | | | 717/107 |
| 2010/0005341 A1* | 1/2010 | Agarwal | G06F 11/3688 |
| | | | 714/38.11 |
| 2014/0229923 A1* | 8/2014 | Sennewald | G06F 11/3692 |
| | | | 717/127 |
| 2015/0378879 A1* | 12/2015 | Ding | G06F 11/3688 |
| | | | 714/38.1 |
| 2017/0139819 A1* | 5/2017 | D'Andrea | G06F 11/3688 |
| 2018/0165179 A1* | 6/2018 | Negi | G06F 11/3672 |
| 2018/0165182 A1* | 6/2018 | Yoshida | G06F 11/3644 |
| 2019/0196946 A1* | 6/2019 | Budhai | G06F 11/3692 |
| 2019/0332524 A1* | 10/2019 | Jayaswal | G06F 11/3692 |
| 2019/0370471 A1* | 12/2019 | Petratos | G06F 8/71 |

OTHER PUBLICATIONS

G. Rothermel, et al., "Selecting regression tests for object-oriented software," Proceedings 1994 International Conference on Software Maintenance, Victoria, BC, 1994, pp. 14-25.

Kabaili, et al., "A change Impact Model Encompassing Ripple Effect and Regression Testing," Département IRO, Université de Montréal, 2001, all pages.

* cited by examiner

OBJECT-ORIENTED REGRESSION-CANDIDATE FILTER

FIELD

The present disclosure relates generally to the object-oriented testing, and more particularly to objected-oriented regression-candidate filtering for test case automation.

BACKGROUND

Developing software applications often continues well after the first version of the application is created. The application undergoes frequent software updates and modifications as features are added/removed and software faults are identified and corrected. Modern applications are frequently designed to operate across multiple devices increasing the likelihood that even modest updates to an application may cause significant software faults within the application. Software updates often have unintended consequences as changes to one aspect of a software function may affect other aspects of the application. For example, modifications to a function declaration may cause faults associated with the locations in the application where the function is called even though the function itself is may be the cause. Detecting the existence of a software fault frequently fails to provide an indication as to the root cause of the fault. Thus, improved methods and systems of software testing are needed.

SUMMARY

A method is disclosed for using an object-oriented regression-candidate filter to test a at least a portion of a software build. The method includes detecting a modification to a current software build, the current software build including a plurality of objects; identifying a set of objects of the plurality of objects of the current software build that are affected by the modification to the current software build; identifying a modification to a previous software build that affected a subset of the set of objects; generating a set of tests that include one or more tests previously executed to test the modification to the previous software build, the set of tests configured to test the subset of the set of objects that were affected by the modification to the current software build; executing the set of tests to test the current software build, wherein executing the set of tests generates one or more test results; comparing the one or more test results to one or more previous test results; and generating, based comparing the one or more test results to the one or more previous test results, an indication that the modification to the current software build is operational.

A system is disclosed for using an object-oriented regression-candidate filter to test a at least a portion of a software build. The system comprising one or more processors and a computer-readable media including instructions which when executed by one or more processors cause the one or more processors to provide operations including detecting a modification to a current software build, the current software build including a plurality of objects; identifying a set of objects of the plurality of objects of the current software build that are affected by the modification to the current software build; identifying a modification to a previous software build that affected a subset of the set of objects; generating a set of tests that include one or more tests previously executed to test the modification to the previous software build, the set of tests configured to test the subset of the set of objects that were affected by the modification to the current software build; executing the set of tests to test the current software build, wherein executing the set of tests generates one or more test results; comparing the one or more test results to one or more previous test results; and generating, based comparing the one or more test results to the one or more previous test results, an indication that the modification to the current software build is operational.

A computer-readable media including instructions which when executed by one or more processors cause the one or more processors to provide operations including detecting a modification to a current software build, the current software build including a plurality of objects; identifying a set of objects of the plurality of objects of the current software build that are affected by the modification to the current software build; identifying a modification to a previous software build that affected a subset of the set of objects; generating a set of tests that include one or more tests previously executed to test the modification to the previous software build, the set of tests configured to test the subset of the set of objects that were affected by the modification to the current software build; executing the set of tests to test the current software build, wherein executing the set of tests generates one or more test results; comparing the one or more test results to one or more previous test results; and generating, based comparing the one or more test results to the one or more previous test results, an indication that the modification to the current software build is operational.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

Figure 1:
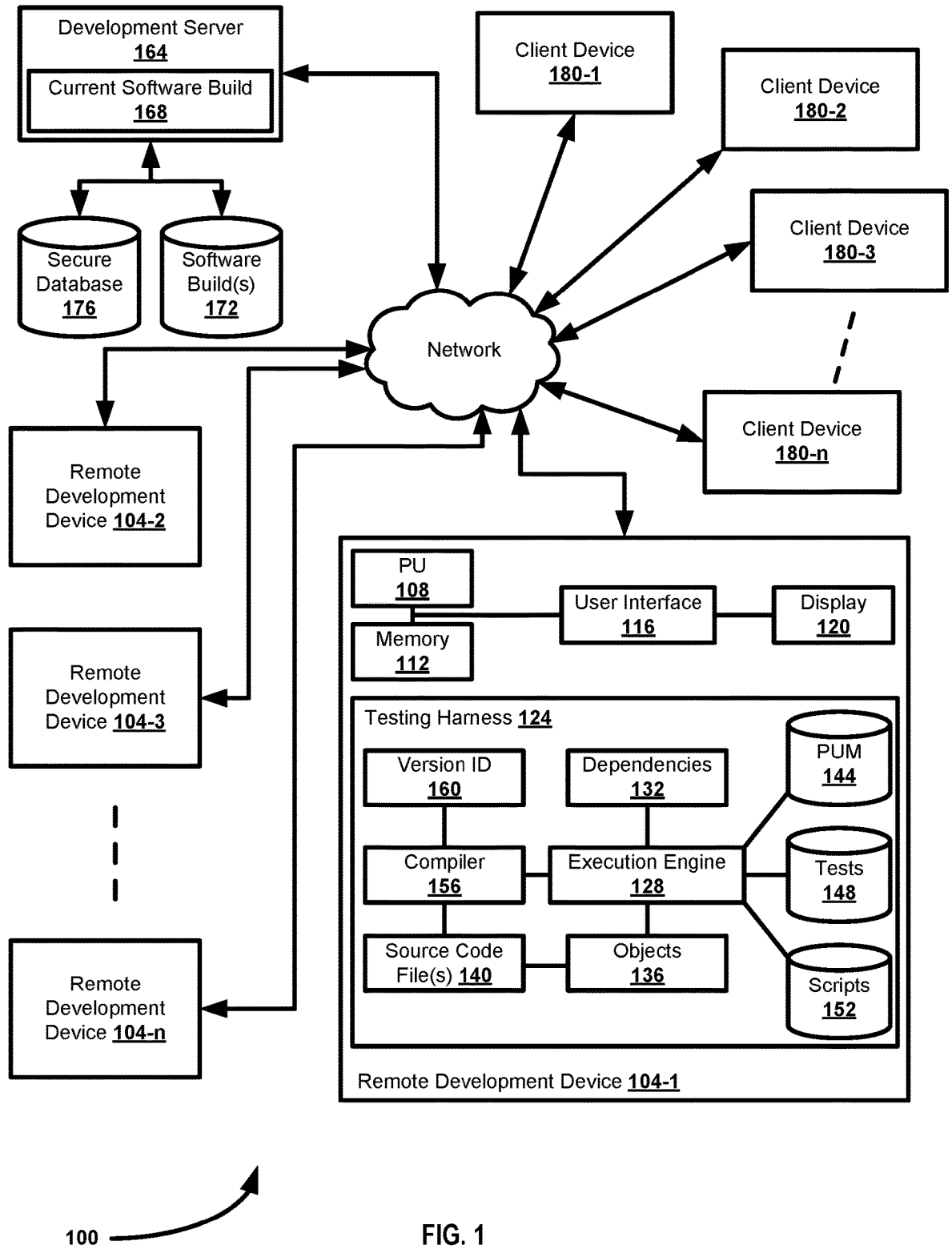
FIG. 1 illustrates an exemplary block diagram distributed development environment.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Object-oriented software development involves designing applications by assembling discrete objects that interact with other objects. As used herein, an object may include one or more fields (e.g., variables of a particular type that hold a value corresponding to that type) and one or more functions. In some example, an object may include an individual unit of source code (e.g., a variable or a function, etc.). Applications may be designed such that some objects may be included in multiple components of an application and/or objects may interact by using fields or functions of other objects. As a result, even a small modification to an object may cause a software fault in a seemingly unrelated component of the application.

Testing applications designed using object-oriented techniques may be more challenging than other types of applications due to the frequency in which objects may be reused and the degree of interaction between objects. Although objects can be individually tested to verify the functionality of the object, testing individual often misses faults caused other objects interacting with an object. For example, a function of a particular object may be modified. Although the object in isolation may not cause a fault, another object that calls the function may trigger a fault having not likewise modified the function call. Test cases may focus on the calling object and fail to identify that the modification to the particular object caused the fault. For another example, objects that have been reused in multiple components of the application may cause a fault in one component and not others hiding the object as the cause of the fault. The challenges in testing object-oriented applications frequently misidentifies the root cause of software faults which may increase testing requirements before an application can be released.

An object-oriented regression-candidate filter may be provided to improve testing object-oriented applications. In some examples, object-oriented regression-candidate filter may increase the accuracy of software testing and reduce the number of test cases that are executed to test a software build. One or more modifications to a software build may be detected. In some examples, the one or more modifications may be applied to an old software build to generate a new software build (e.g., using a concurrent versioning system as described above). For example, the one or more modifications may include a feature that was added to the old software build which incremented a version identifier of the old software build to the new software build. The one or more modifications may include any added, deleted, and/or modified source code files, objects, application features, and/or the like.

A set of objects affected by the one or more modifications may be identified. Objects may be affected by a modification directly, indirectly, or both directly and indirectly. For example, objects may be directly affected by a modification based on the source code of the object being modified. An object may be indirectly affected by a modification based on being dependent on modified portion of the software build. For example, an object may inherit the properties of a parent object (e.g., the superclass or the like). A modification to the parent object may affect instances of the object even though the object itself is unmodified.

One or more previous modifications may be identified such as modifications to earlier versions of the software build. In some examples, the one or more modifications include modifications to an object that is also included in the set of objects (regardless of the version identifier of the object). Modifications may be identified from the most recently preceding software build or from any previous version of the current software build. Any number of modifications may be identified from any number of previous software builds.

A set of test cases may be identified to test the software build. The set of test cases may include test cases that were executed to test the one or more previous modifications. For example, test cases may be identified based on a test case having been successfully executed to test the one or more previous modifications. In some examples, the results of executing a test case may be compared to a previous result (e.g., the previous execution of a test case that tested the previous version of one or more objects). In other examples, the results of executing a test case may be compared to a predicted or expected result. For example, a test case may test the functionality of a particular object by providing a range of inputs to determine that the output conforms to an expected output. In still yet other examples, the result of executing a test case may output a success or failure without a further comparison. The results of executing the set of test cases on the current software build may determine that a particular modification operates as intended or is a cause of a software fault.

FIG. 1 depicts an exemplary environment 100 providing object-oriented regression-candidate filtering for software build testing. The environment includes one or more development device 104-1, 104-2, 104-3 . . . 104-*n* which either individually or together develop new software (or update existing software in development). Although four devices are shown, any number of development devices may be included, including a single development device. Exemplary development device 104-1 includes a set of components 108-156 that may or may not be included each of development devices 104-2, 104-3 . . . 104-*n*. In some examples, each of the development devices include an identical set of components. In other examples, each development device may have customized components based on the particular functions performed by that device (or a user of that device).

Development device 104 includes processing resources including one or more processing units and one or more memories. The one or more memories may be any of volatile, non-volatile, short term (e.g., random access memory, cache, etc.), long term (e.g., flash memory, hard disk drive, compact disk, etc.), virtual (e.g., remote memory, cloud storage, etc.), or any combination thereof. In some examples, development device 104 may be a thin client in which processing and/or storage functions occur in a remote device such as another development device or development server 164. Development device may also include a user interface 116 and a display 120 for interacting with the hardware and software components of the development device (and/or other development devices 104, development server 164, and/or client devices 180).

Remote development environment include a testing harness 124 for developing and testing new software builds (either of an new software product or an existing software product). In some examples, the testing harness 124 may be connected to processing unit 108 and memory 112 through a bus. For example, testing harness 124 may be embodied as a system on a chip that work with the remaining processing features of device 104. In other examples, the testing harness 124 may include software instructions that are executed by processing unit 108. Testing harness 124 includes an execution engine 128 that coordinate the development and testing of software applications by execute instructions. In some examples, development and/or testing may occur within or in association with an integrated development environment.

Testing harness 134 includes source code files 140 that may be stored in a un-compiled, semi-compiled (e.g., byte-code or the like), or compiled (e.g., machine code) state. Source code files 140 may include source code files corresponding to the software build in development/testing and instructions associated with the test cases or test framework. In some examples, source code files includes a checked-out copy of the current software build in development. For example, development device 104-1 may request the most updated copy of one or more source code files of the current build stored by the other development devices 104, development server 164, or generate a local copy of the build within development device 104-1 (e.g., stored/represented in memory 112 and/or in source code file 140). Source code files may be passed to compiler 156 which may then generate an executable form of the most recent software build (or any previous software build). Version ID 160 may enforce the version of any source code file, object, and/or build created or modified by development device 104-1. In addition, Version ID 160 may obtain the correct version of any source code file, object, test, potentially unwanted modification to a software build (PUM), script, and/or software build from the corresponding blocks 132-160, development server 164, or other development device 104.

Execution engine may (among other development tasks) controls the execution of software build testing. In addition, execution engine may coordinate the generation of software builds to test (using development server 164 and/or compiler 156). Execution engine may use dependencies 132 to identify test cases, objects, and/or source code files that may rely on other test cases, objects, and/or source code files to function and/or test. For example, dependencies 132 may enable the execution engine to test isolated portions of a software build that do not depend on other portions of the software build. The execution engine may test these isolated portions with or without generating the software build. Dependencies 132 may identify the source code files and/or objects associated with a particular modification. In some examples, dependencies 132, may simulate a portion of a software build that source code or objects depend on in order to test the source code or objects. Execution engine may thus enable piecemeal testing of software builds with quickly and accurately as less interconnecting parts may produce better testing results.

Objects 136 include portions of an object-oriented software build. In some examples, the software build is designed using an object-oriented framework. For example, the software build may be programmed using an object-oriented programming language such as C++, Java, or the like. In other examples, the software build may be partially object-oriented and include a programming language of another type (e.g., C, Javascript, Lisp, etc.). Objects may have a version associated therewith. Objects may be identified by an identifier as well as a version such that generating a particular software build is accompanied with the correct object and object version. In some examples, objects 136 include previously generated objects (in a compiled, semi-compiled, or uncompiled state) from previous software builds of the software under development/test. In other examples, objects 136 represent objects used in generating a recent or current software build (e.g., some of which may be previously generated and some of which may be new).

Execution engine receives testing data from potentially unwanted modification (PUM) 144, tests 148, and scripts 152 to test the software build (or a portion thereof). Potentially unwanted modifications represent modifications to a previous software build that (together with zero or more other modifications) created the current software build. Potentially unwanted modifications may be the cause of some unwanted functionality, errors, faults, or some other undesirable characteristic of the current software build (e.g., slow loading, network latency, etc.). As used herein, the term fault may include anything that causes a software build to operate unexpectedly (unexpected behavior, improper output or functionality, etc.) or that causes the software build to stop operating (e.g., infinite loop, software build crash, system crash, etc.). Potentially unwanted modification 144 may include an identification of potentially unwanted modifications that have been detected in versions of a software build (e.g., including previous versions of the software build). The PUM 144 may also include a correspondence between an identified potentially unwanted modifications and test cases that were used to test the potentially unwanted modification, the source code files, objects, and/or scripts that were affected by the potentially unwanted modification, and/or related build information of the software build being tested (e.g., testing environment information, dependencies, testing conditions, testing results, and/or the like). A test record may be formed to link the associations between a particular potentially unwanted modification, the objects associated with the modification, and the test cases that were executed to test the objects.

Tests 148 may include a plurality of test cases including those that have been previously generated to test at least a portion of a software build (and/or a potentially unwanted modification). Test cases include a set of instructions that test the functionality of one or more source code files or objects, including to test for correct output given a particular input, exception handling given unexpected input, and/or the presence of various other errors and faults. In some examples, test cases may be automatically generated (using execution engine 128, source code files 140, object 136, dependencies 132, and/or scripts 152). For example, detecting unexpected behavior may cause the test harness 124 to automatically assemble a test case to identify the correct functionality of any particular portion of the software build or to identify the root cause of the unexpected behavior (e.g., the particular object(s), source code file(s), and/or compiler configuration that may have caused the unexpected behavior). In other examples, the test cases are generated manually, or semi-manually.

Scripts 152 includes one or more sets of instructions for generating the testing environment, test cases, and/or the software build (or a portion thereof). For example, scripts 152 may generate a testing environment to simulate particular testing conditions. In some examples, the testing conditions may include a clean room (e.g., isolated environment without other applications and/or operating systems), a server side environment, a client side environment, a distributed environment, high network traffic, high input/output traffic, low processing resource availability, or the like. By simulating different environments a software build may be tested in different conditions thereby identifying faults, root cause, and/or undesirable functionally that may not ordinarily be detected during testing.

Scripts 152 may contain instructions for generating new (or reconstructing previously executed) test cases. For example, scripts 152 may include portions of code that can be assembled or arranged so as to test particular features, objects, and/or source code of the software build. Scripts 152 may also contain instructions for generating and/or simulating portions of software build. For example, testing a portion of a software build (e.g., a particular feature set) may not require compiling the entire software build. Scripts 152 may be used to simulate different aspect of the software build not generated by simulating input and/or output to/from the portion of the software build compiled for testing so that the entire software build need not be compiled for software testing.

Development devices 104 may be connected to a development server 164 and client devices 180 through a network. In some examples, the network may be a local or wide area network such that the development devices are within a vicinity of the development server. In other examples, the network may be the Internet in which development devices 104 and development server 164 may be geographically remote other devices. In still yet other examples, the network maybe a combination of multiple networking types such local area networks, wide area networks, the Internet, wireless networks, peer-to-peer networks, combinations thereof, or the like.

Development server 164 may provide central control over a software development project that includes development devices 104. Development server 164 may operate a concurrent versioning system that organizes the files of software builds. The concurrent versioning system may identify the files corresponding to a software build including any particular version of files. The concurrent versioning system tracks multiple builds allowing a development device or client the ability to revert to a previous software build. In some examples, development devices 104 intent on modifying a version of the software build may "check-out" one or more source code files from development server 164 to add, modify, or remove source code. Once checked-out, a copy of the source code files may be stored locally in the development device (e.g., at source code files 140). In some examples, once a file is checked-out, other development devices cannot modify the check-out files. In other examples, other development devices may also check-out a checked-out file and any additional changes to the files may be resolved by development server 164 and/or any of the development devices.

Once development device completes modifying (or deleting) a source code file, the file may be "checked-in" to the development server 164. The check-in process enable a development device to resolve difference between the file's original form and the modifications introduced by the development device 104. For example, if a development device checks-out a file with multiple functions, deletes one of the functions, and then checks the file in, the development device will be informed that the function was deleted and, in addition, may present the development device with other information on how this change may affect other files (e.g., the places in the source code in which the now deleted function was called). The check-in process may be manual, semi-automatic, or automatic (e.g., no human intervention) based on the severity of the differences. Once changes to a file have been accepted, a version associated with that file may be incremented. In some examples, if the source code file corresponds to an object, then the version associated with the object will also be incremented. Altering one or more files associated with the a current software build may also increment a version identifier of the overall software build, though in some examples, a version associated with a software build may be incremented when new software build is generated (e.g., when modifications to the previous software build have been made).

Development server 164 includes an indication of a current software build 168 that represented the most recent version of a software build under development by the development devices. The current software build may be compiled or otherwise packaged by the development server (and/or development devices 104) for distribution to one or more client devices 180. The client devices 180 may receive and execute the current software build 168 locally. In some examples, the current software build is a web application that executes on the development server 164, the cloud, development devices 104, or the like and merely provides a user interface to the client devices 180 to interact with.

Development server 164 stores one or more previous software builds (e.g., previous versions of the software under development) in a database (e.g., software builds 172). The development server through the concurrent versioning system may use the database of software builds 172 to roll back to a previous software build (e.g., based on encountering a fatal error in the current software build) or acquire one or more files and/or objects from one or more previous software builds that may be reused in a new software product or new software build. Development server 164 may also include a secure database 176. Secure database 176 may store other information related to the development process including, but not limited to, generated test cases, compiler configuration information, software build requirements, client device requirement and/or information, development device requirements and/or information, testing environments, scripts, and/or the like.

Figure 2:
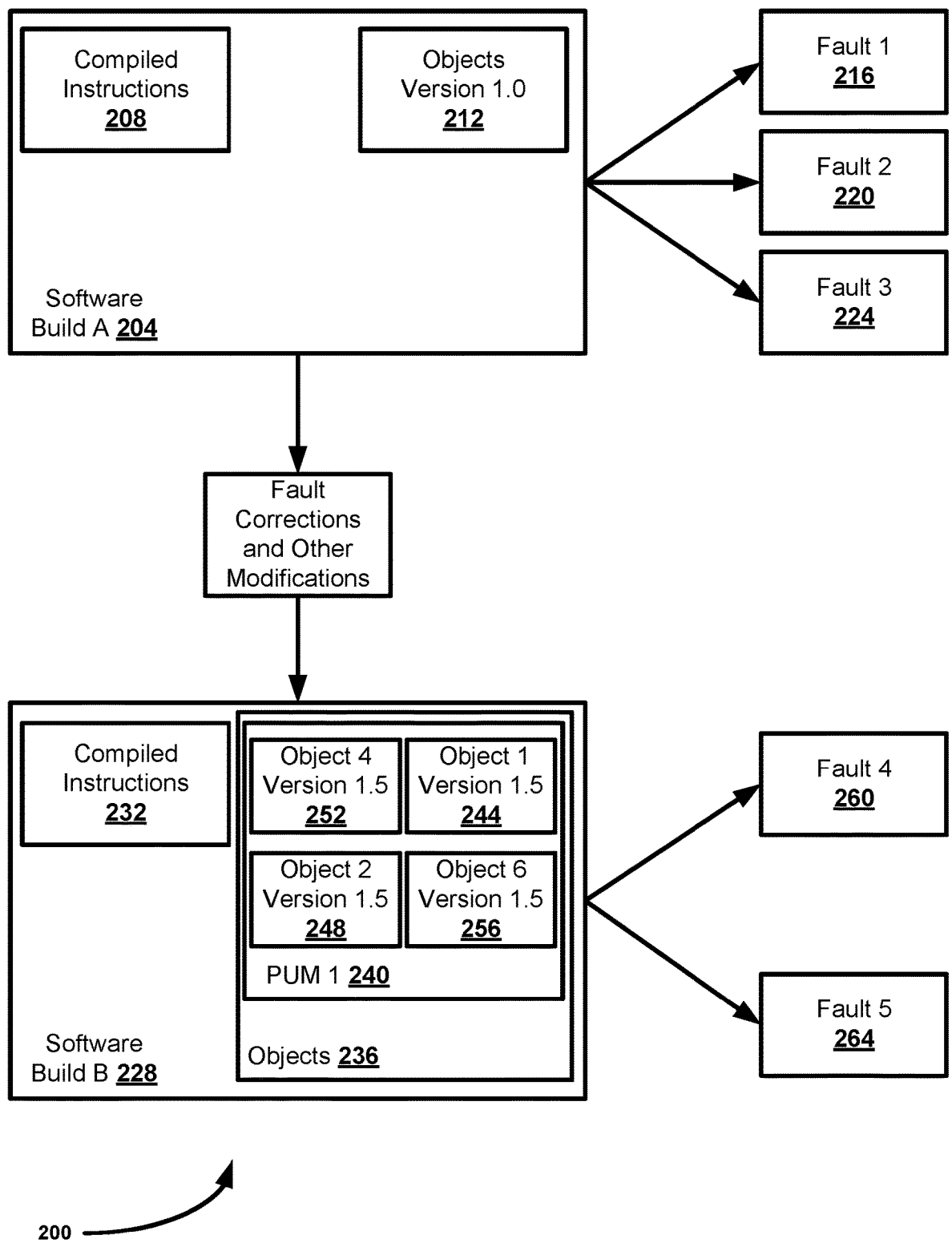
FIG. 2 illustrates an exemplary block diagram describing software build testing during software development.

FIG. 2 depicts an exemplary block diagram 200 of a development process including multiple software builds. An initial software build (e.g., software build A 204) may be presented. In some examples, the initial software build may be a first version of a software product that is either being tested, under further development, or released (e.g., executing on one or more client devices). In other examples, software build A 204 may represent any milestone version (e.g., a major version such as 1.0, 2.0, etc.) or any incremental inversion (e.g., version 1.1). In some examples, software build A 204 may represent an initial software build for the purposes of the following description.

Software build A 204 includes one or more source code files that may exist in a compiled state (e.g., compiled instructions 208), intermediate language (e.g., object code, bytecode, etc.), uncompiled (e.g., one or more files, not shown), or any combination thereof. For example, a software build may include or execute in conjunction with a just-in-time compiler in which the software build executes while one or more instructions have yet to be compiled. The one or more instructions may be compiled immediately before execution. In some examples, the software build may be partially compiled into an intermediate language code (e.g., object code, bytecode, etc.) in which a virtual machine may interpret or otherwise just-in-time compile the intermediate code into machine code for execution.

Software build A 204 includes one or more objects 212. Although objects are depicted as being of version 1.0, objects may be of any particular version. For example, if software build A 204 is the very first version of the software build released the objects may also be a first release version (e.g., version 1.0). In examples in which software build A 204 may be a subsequent software build, objects 212 may be of any particular version and including many different versions. For example, software build A 204 may be software build version 2.0 in which a particular major revision to a portion of the software product was made. Objects that were modified between version 1.0 and 2.0 may have a version identifier corresponding to 2.0 since those objects have been modified. Objects that were not modified between versions may have a version identifier that remains unchanged (e.g., version 1.0). A version of an object 212 may be incremented when any field or function is added, removed, and/or modified. In some examples, metadata associated with each object may store a version identifier corresponding to that object.

Software build A may be developed and/or released to one or more client devices according to the descriptions of FIG. 1 above. For example, upon generating software build A 204, the software build may be tested. Testing may include executing one or more test cases as well as receiving bug reports (e.g., from testers and/or client devices), manual testing, and/or the like. In some examples, testing may be used to identify a software fault (e.g., determine if the software build is operating correctly) or to identify a root cause (e.g., the portion of the software build causing the fault). As depicted, software build A 204 includes three faults, fault 1 (216), fault 2 (220), and fault 3 (224). Although three faults are depicted, testing may reveal any number of faults (e.g., zero or more). Software faults may represent fatal errors in the functionality of the software build (e.g., crashes), undesired functionally (e.g., network latency, slow loading), faulty or unexpected output, and/or the like.

Upon detecting a fault, the software build may return to a development phase in which one or more development devices (104 of FIG. 1) may provide further testing to identify a root cause of a software fault. Faults 216-224 may be mitigated by modifications to one or more objects and/or source code files. In addition, one or more additional features may be added to software build A 204. In some examples, a software build may be modified upon a major revision. In those examples, one or more software faults may be left unresolved until one or more development devices prepares additional features (e.g., new or revised objects, source code, etc.) intended for a subsequent version of the software build. At that time, the faults 216-224 may be resolved during the implementation of the additional features.

In other examples, one or more of faults 216-224 may be severe (e.g., fatal crashes or unexpected/no output). In those examples, one or more development devices may correct the fault by adding, removing, and/or modifying source code files and/or objects to generate a patch which includes a set of instructions to modify an existing software build executing on a client device. The patch may be generated to correct the one or more faults instead of adding additional features. Upon executing the patch, the version identifier of the software build may increment due to the changes to the objects/source code. In some examples, the version identifier may increment by a smaller amount upon executing a patch to fix one or more faults. For example, a patch may increment version 1.0 to version 1.1 whereas a release of a subsequent software build with added features (as well as to fixes for faults) may be incremented to 2.0. The version identifier may be any alphanumeric set of characters and/or numbers that indicates a difference between a previous build and a subsequent build. The version may be incremented as part of a common upgrading scheme in which it may be possible to determine if a particular modification to a software build is a subsequent software build (e.g., the version identifier is incremented to end in zero, or some other predefined number or character) or a minor patch or update (e.g., the version identifier is incremented to end in a non-zero number, a different predetermined number or character, adding an additional decimal point, etc.). In some examples, upon detecting a severe fault, development devices may modify the software build to correct for software faults to avoid having to send out multiple patches to the software build. In other examples, detecting a severe fault may cause development devices to modify the software build to fix just that fault to enable the correction to be generated and distributed to one or more client devices faster than generating a patch to correct multiple faults at once.

Development devices or development server may distribute a new software build (e.g., software build B 228) to client devices once development of any modifications to the earlier software build are complete. For example, software build B may include added, removed, and/or modified features and/or added, removed, and/or modified source code file(s) and/or objects to correct one or more faults in the previous software build. Once development is complete software build B may be generated. Software build B may include compiled instructions 232 which may include the same or a modified version of compiled instructions 208 (e.g., including one or more added, removed or modified instructions). Compiled instructions 232 may include instructions in any state (compiled, intermediate language code, uncompelled, or combinations thereof) including a state that is different from compiled instructions 208. For example, software build A 204 may have compiled the instructions into an intermediate language code (e.g., bytecode) to be interpreted by a virtual machine for execution. Software build B may include compiled instructions in machine code that can be directly executed by a processor of the client device.

Objects 236 include potentially unwanted modification 1 (240). A potentially unwanted modification may be any modification to a software build which may be the cause of undesirable functionality (e.g., slow operation, network latency, temporary halts, etc.), faults, or otherwise faulty operation of a software build. For example, modifications to fix a previous fault or add additional functionality may cause the software build to execute slowly taking up too many processing cycles. Potentially unwanted modification 1 (240) includes a modification to four objects, object 1 (244), object 2 (248), object 4 (252) and object 6 (256). Although one potentially unwanted modification is shown modifying four objects, a subsequent software build may include any number (zero or more) of potentially unwanted modifications. In addition, potentially unwanted modifications may modify any number (zero or more) of the objects of a software build. Modified objects may be identified by an object identifier and a version identifier. For example, the object identifier and/or version identifier may be a universally unique identifier (UUID), a hash value (generated by any hashing function), an alphanumeric name, a number (e.g., an integer, binary, or hexadecimal) or the like. The four modified objects depicted have a version identifier that has been incremented as a result of the modifications introduced to software build A to generated software build B.

Prior to distributing the new software build B, the build may be tested using one or more test cases. Testing a software build may identify one or more new software faults introduced as a result of modifying software build A to create software build B. For example, the identification of fault 260 and fault 264 may be the cause of the modification being labeled as a potentially unwanted modification. In other examples, the label of a potentially unwanted modification may not be associated with the identification of software faults identified after the introduction of the modification. In those examples, modifications may be labeled as potentially unwanted until testing verifies the integrity and functionality of the modification. In some examples, the same software faults may identified as identified in a previous software build (e.g., software build A). For example, one or more modification added to the software build to correct a previous fault may not have done so and as a result the fault may persist in the new software build (e.g., software build B). Thus, fault 260 and fault 264 may be unique (e.g., new faults introduced via modifications to software build A to generate software build B), reoccurring (e.g., the same fault as occurring in one or more previous software builds), or newly identified (e.g., a latent fault that existed in a previous software build, unknown until the current software build was tested), combinations thereof, or the like.

One or more test cases may be executed to test the potentially unwanted modification to determine whether a modification may be maintained or removed. In some examples, a test case database may be queried to identify test cases to test modified objects of a potentially unwanted modification. For example, a query may use particular objects or particular potentially unwanted modifications to identify one or more test cases that may be executed to test the particular objects or particular potentially unwanted modifications. The one or more test cases may be identified based on having been executed to test one or more previous versions of the modified objects and/or potentially unwanted modification. For example, the initial versions of object 1 (244), object 2 (248), object 4 (252), and object 6 (256) (e.g., version 1.0 of objects 212) may have been tested using one or more test cases. Upon testing the potentially unwanted modification 1 (240) a query can be made to identify the particular one or more test cases that were executed to test version 1.0 of object 1 (244), object 2 (248), object 4 (252), and object 6 (256). The particular one or more test cases may then be scheduled to test the modified version (e.g., version 1.5) of object 1 (244), object 2 (248), object 4 (252) and object 6 (256) included in the potentially unwanted modification.

In some examples, one or more of the modified objects may not be associated with a previously executed test case or are newly added by software build B 228 have not yet been tested. In those examples, one or more new test cases may be generated to test objects that are not associated with a previous test case. The new test cases may be manually, semi-automatically, or automatically generated based on the analysis of the objects, the fault, and/or the potentially unwanted modification. For example, it may be determined through an analysis that a first object may be similar in structure to second object that has been tested. The test cases executed to test the second object may be used to test the first object. In some examples, the test cases may be adapted or modified to test the specific structure of the first object based on the analysis. Accordingly, testing a software build may involve one or more previously executed test cases, one or more modified or adapted test cases, and/or one or more newly generated test cases.

Figure 3:
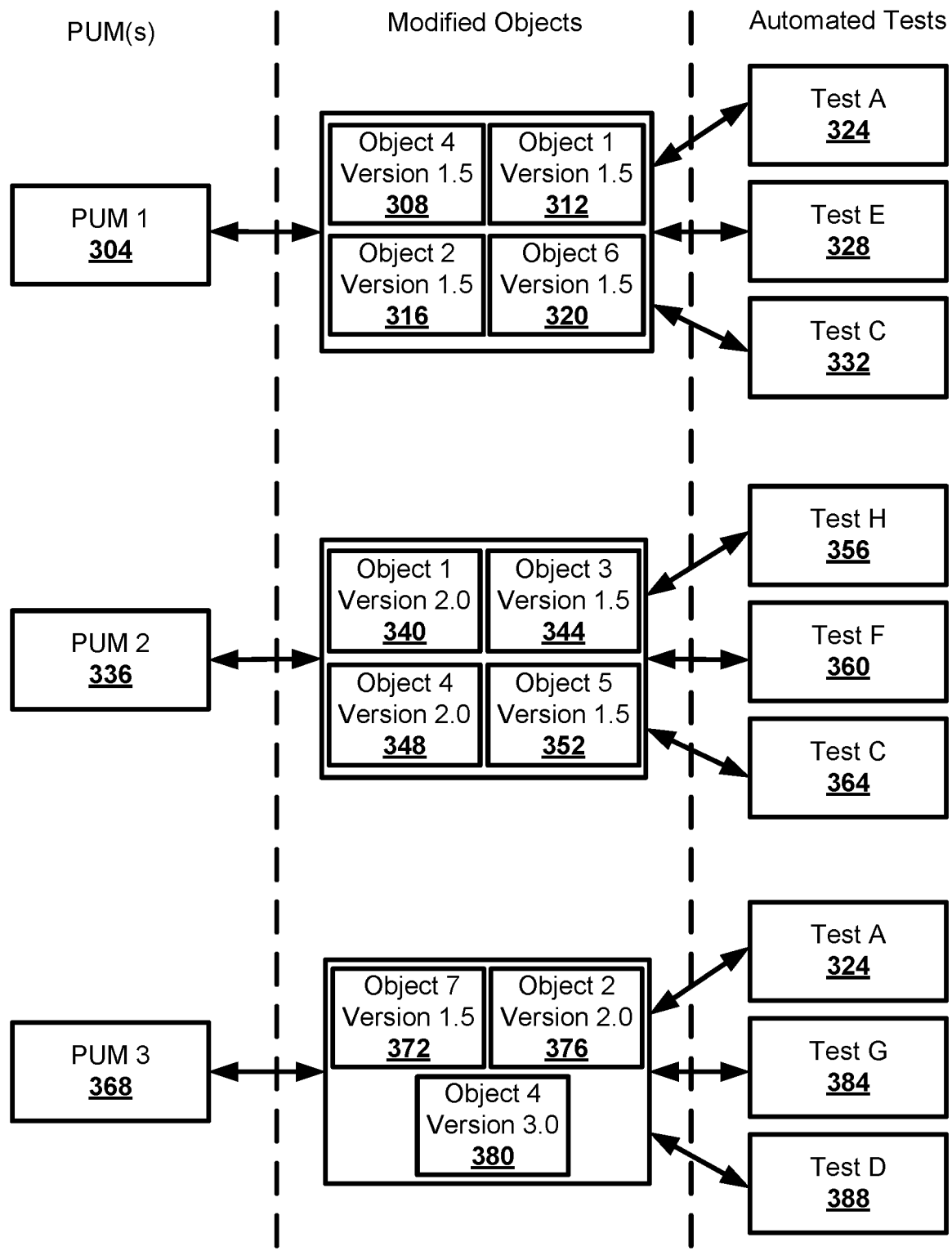
FIG. 3 illustrates an exemplary block diagram of a test record associating potentially unwanted modifications, objects, and test cases.

FIG. 3 depicts an exemplary block diagram 300 of a test record associating potentially unwanted modification, objects, and test cases. A test record may be generated and stored for potentially unwanted modifications of a software build. The testing record provides an association between the various elements involved in a fault (undesirable feature, etc.) to enable subsequent software builds to reuse elements of a previous testing phase (e.g., test cases). The testing record may also be used in a coverage analysis of potentially unwanted modifications or test cases. Coverage analysis may be used to identify the percentage of an unwanted modification and/or software build tested by a particular test case. Coverage analysis may also be used to identify the percentage of a software build taken up by a potentially unwanted modification. In some examples, coverage analysis refers to code coverage (e.g., the number of instructions or lines of codes covered by a test case). In some examples, coverage analysis may count the number of objects tested versus the number of objects in a potentially unwanted modification or the software build. In still yet other examples, a combination of methods may be used in code coverage. For example, percentage of objects covered in the software build, percentage of objects covered in the potentially unwanted modification, lines of code, or combinations thereof.

A test record may include an association between a potentially unwanted modification, one or more objects modified or affected by the potentially unwanted modification, one or more test cases that test the one or more objects, and in some examples one or more faults that are associated with any of the one or more test cases, the one or more modified objects, or the potentially unwanted modifications. Potentially unwanted modification 1 (304) may correspond to object 1 (312), object 2 (316), object 4 (308) and object 6 (320). In some examples, the particular version of the object may be identified to distinguish versions that correspond to the potentially unwanted modification from versions of the objects unassociated (e.g., previous or subsequent versions of the objects). Object 1 (312), object 2 (316), object 4 (308) and object 6 (320), may be associated with test cases 324-332. Although three test cases are depicted any number (zero or more) of test cases may be associated with the modified objects.

In some examples, one or more of faults, indications of undesirable functionality, and/or indication of incorrect operations may also be associated with an individual record. For example, testing a potentially unwanted modification may determine that the potentially unwanted modification is associated with a particular fault. In subsequent software builds if a fault having the same or similar identifier is detected, then an initial root cause determination may be made. For example, the test record may be queried to determine one or more test cases that may test for the fault, one or more objects that may be determined as a potential cause for the fault, and/or one or more potentially unwanted modifications that may be determined as a potential cause for the fault. Storing the fault associated with a particular test record may decrease the testing time to isolate areas of the source code and/or associated objects that may be the cause of the software fault. For example, upon detecting a fault in a current software build, the test record may indicate that a particular potentially unwanted modification in a previous software build was also associated with this particular fault. It may then be determined that the potentially unwanted modification of the previous software build has one or more objects in common with a potentially unwanted modification in the currently software build. The objects in common may be an initial indication of a likely cause of the fault and be the first objects tested. Accordingly, by analyzing the test record it may not be necessary to test the entire software build to determine the particular areas of the software build that are likely the cause of a fault.

Three potentially unwanted modifications are depicted in the exemplary block diagram of FIG. 3. The three potentially unwanted modifications may be associated with a same software build or subsequent software builds. In some examples, the test record associates a potentially unwanted modification with corresponding objects and test cases. For example, a test record may include blocks 304-332 in a test record. In other examples, the test record may include potentially unwanted modifications corresponding to a software build. For example, if potentially unwanted modifications 304, 336, and 368 were modifications made to a first software build to generate a second software build, the corresponding test record may link potentially unwanted modifications 304, 336, and 368, as well as the corresponding objects (308-320, 340-352, and 372-380 respectively) and test cases A-H (324-332, 356-364, and 384-388 respectively).

In some examples, test records may link associated potentially unwanted modifications. For example, a first potentially unwanted modification maybe associated with an addition/modification of a feature set in the software build. Subsequent potentially unwanted modifications that also add/modify the feature set in later software builds may be linked to this potentially unwanted modification to further associate related objects and test cases. In those examples, the test record may form a doubly linked-list or similar data structure in which test records or potentially unwanted modifications may be a node with a link to a next most recent associated test record or potentially unwanted modification and a link to the previous test record or potentially unwanted modification. The doubly linked-list data structure may enable a development device (e.g., 104 of FIG. 1) to review a historical record of associated test records or potentially unwanted modifications to identify everything from a very first test record or potentially unwanted modification (that may have introduced a particular fault or otherwise undesirable functionality) to the most recent test record or potentially unwanted modification. In some examples, test records or potentially unwanted modifications include a timestamp that indicates a time in which the test record was created or potentially unwanted modification was added to a software build. The doubly linked-list may order test records or potentially unwanted modifications by timestamp, fault, or any other attribute of the test records. The doubly linked-list may be reordered based on a change to an order criteria. In some examples, nodes of a doubly linked-list includes the test records corresponding to a particular software build. In other examples, nodes of the doubly linked-list include a test record and/or a potentially unwanted modification.

Test cases A-H (324-332, 356-364, and 384-88) are identified by a particular alphabetic identifier, though any such identifier (e.g., UUID, alphanumeric character, hash, etc.) may be used. Test cases may be associated with a coverage attribute that indicates a particular set of objects that a test case tests. In some examples, the test cases may test one or more objects including objects that may not be associated with a particular potentially unwanted modification. For example, test case F 360 may test objects 1, 5, 8 and be used to test a portion of potentially unwanted modification 2 (336) despite potentially unwanted modification 2 (336) not including an object 8. Tests cases may test objects more than once. For example, both test case A 324 and test case E 328 cover object 6 (320). In addition, test cases may be reused to test other potentially unwanted modifications corresponding to a same or subsequent software build. For example, test A 324 may execute to test potentially unwanted modification 1 (304) and again to test potentially unwanted modification 3 (368).

Figure 4:
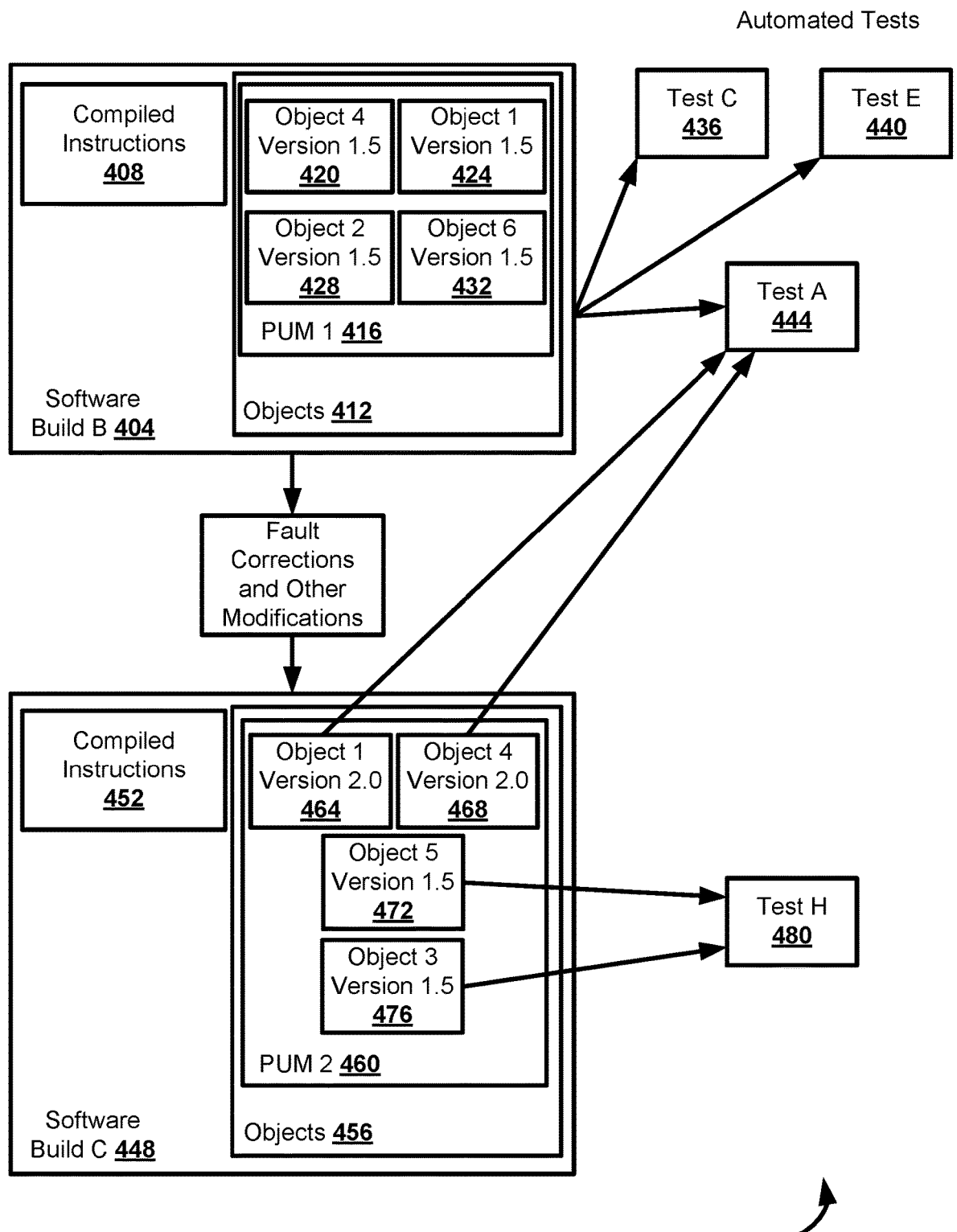
FIG. 4 illustrates an exemplary block diagram of regression-candidate filtering.

FIG. 4 depicts an exemplary block diagram 400 of an object-oriented regression-candidate filter. Software build B 404 may include compiled instructions 408 and objects 412 which include modified objects 420-423 as part of a potentially unwanted modification 416. In a testing phase, software build B 404 and more specifically potentially unwanted modification 416 may be tested using one or more test cases 436-444 that test the modified objects 420-432 of the potentially unwanted modification 416. As noted above, test cases 436-444 test one or more objects associated with the potentially unwanted modifications. A test record may be generated to store the association between the test cases 436-444 and the particular objects tested by the test cases (and the potentially unwanted modification 416).

As a result of the testing phase, one or more additional modification (e.g., potentially unwanted modification 2) as well as added, removed, or modified features may be developed to generate a subsequent software build, software build C 448. Software build C 448 may also include compiled instructions 452 and objects 456. A subset of objects 456 may include one or more modified objects (modified since software build A 404) as part of potentially unwanted modification 2 (460). Potentially unwanted modification 2 (460) includes one or more modified versions of the objects that were included in software build B 404. In some examples, objects 456 may also include one or more objects that have been add or removed from objects 412.

Potentially unwanted modification 2 (460) includes four modified objects (object 1 (464), object 3 (476), object 4 (468), and object 5 (472)). Objects may include a version identifier to indicate the particle version of an object. As shown, objects 1 and 4 were included in potentially unwanted modification 1 (416) and have since been modified. Thus, the version identifier of object 1 (424) and object 4 (420) as associated with potentially unwanted modification 1 (416) was version 1.5. As object 1 (424) and object 4 (420) may have been modified as part of potentially unwanted modification 2 (460) of software build C 448, the corresponding identifier of the objects have been incremented to version 2.0. While the version identifier has been incremented by 0.5, the version identifier may be incremented by any real number. In some examples, the incremented amount may be based on the severity of the update with, for example, less severe updates having a low incremented amount and more severe updates having a higher incremented amount.

After software build C is generated, the software build moves to a testing phase prior to distribution to one or more client devices. Testing software build C may proceed in a similar manner as testing software build B in which one or more test cases execute to test the build. In some examples, testing may use data gathered from testing one or more previous software builds (e.g., software build B) such as the test record described in connection with FIG. 3. In those examples, the potentially unwanted modification may be analyzed to determine objects associated with the modification. The database of test records may be queried to identify one or more of the objects of the potentially unwanted modification 2 (460) and/or a similar potentially unwanted modification to potentially unwanted modification 2 (460). The returned test records may identify that a version of one or more of the objects of potentially unwanted modification 2 (460) may have been previously tested as part of a previous software build. For example, version 1.5 of object 1 (464) and object 4 (468) were tested in connection with software build B.

A test record may identify the particular test cases that were executed to test the previous version of the objects and/or the results of those tests to enable a development device to identify if one or more of the previously executed test cases may be used to test the current versions of the corresponding objects. For example, the test record may identify that test case A 444 was used to test the earlier version of object 1 (464) and object 4 (468). One or more resources used to test software build C may be reduced by executing test case A 444 to test version 2.0 of objects 1 (464) and version 2.0 of object 4 (468). In other words, the software build C may not need to generate new test cases to test potentially unwanted modification 460.

Some of the objects of a potentially unwanted modification may not have been previously tested. For example, although objects 1 and 4 have been previously tested, potentially unwanted modification 2 (460) includes two objects that have been previously tested (i.e. objects 1 and 4) and two objects that have not been previously tested, object 3 (476) and object 5 (472). Testing potentially unwanted modification 2 (460) may include testing the objects associated with the potentially unwanted modification. Objects 1 and 4 may be tested by re-executing test case A 444 and one or more new test cases may be obtained (newly generated or obtained via a database of test cases) to test the objects not covered by a previously executed test case. Objects 3 (476) and object 5 (472) may be tested using a newly generated test case H 480.

In some examples, the results of the previous executions of a test case may be used to determine whether the tests were executed successfully or were otherwise successful in providing a verification of corresponding objects. For example, test case A may have been previously executed to test object 1 (424), and the results of the execution may reveal the test case did not accurately identify object 1 (424) as the cause of a particular fault (i.e. a false negative). In that example, although test case A 444 was previously executed to test a version of the objects included in potentially unwanted modification 2 (460), the test case may not be used to test the updated version of those objects based test case A. One or more other test cases may be identified and/or generated to a test version of object 1 included in potentially unwanted modification 2 (460).

In other examples, the results of executing a test case may be compared to a stored result to provide an indication as to whether the objects tested by the test case operate as intended or are the cause of a fault. For example, test cases may generate an output that may be compared to an expected output (e.g., testing accuracy and/or the presence/absence of software faults or errors). In another example, test cases may be compare the output to an output generated from a previous execution of the test case (e.g., testing consistency). The output of test cases may indicate whether the test case executed successfully, detected an error or fault, and/or the like based on the output alone or through comparison to a stored result or previous execution. The output of test cases may provide an indication that a modification to the current software build is operational (e.g., operates as intended and no faults are detected) or faulty (e.g., producing unexpected results, causing faults or errors, unhandled exceptions or interrupts, and/or the like).

Figure 5:
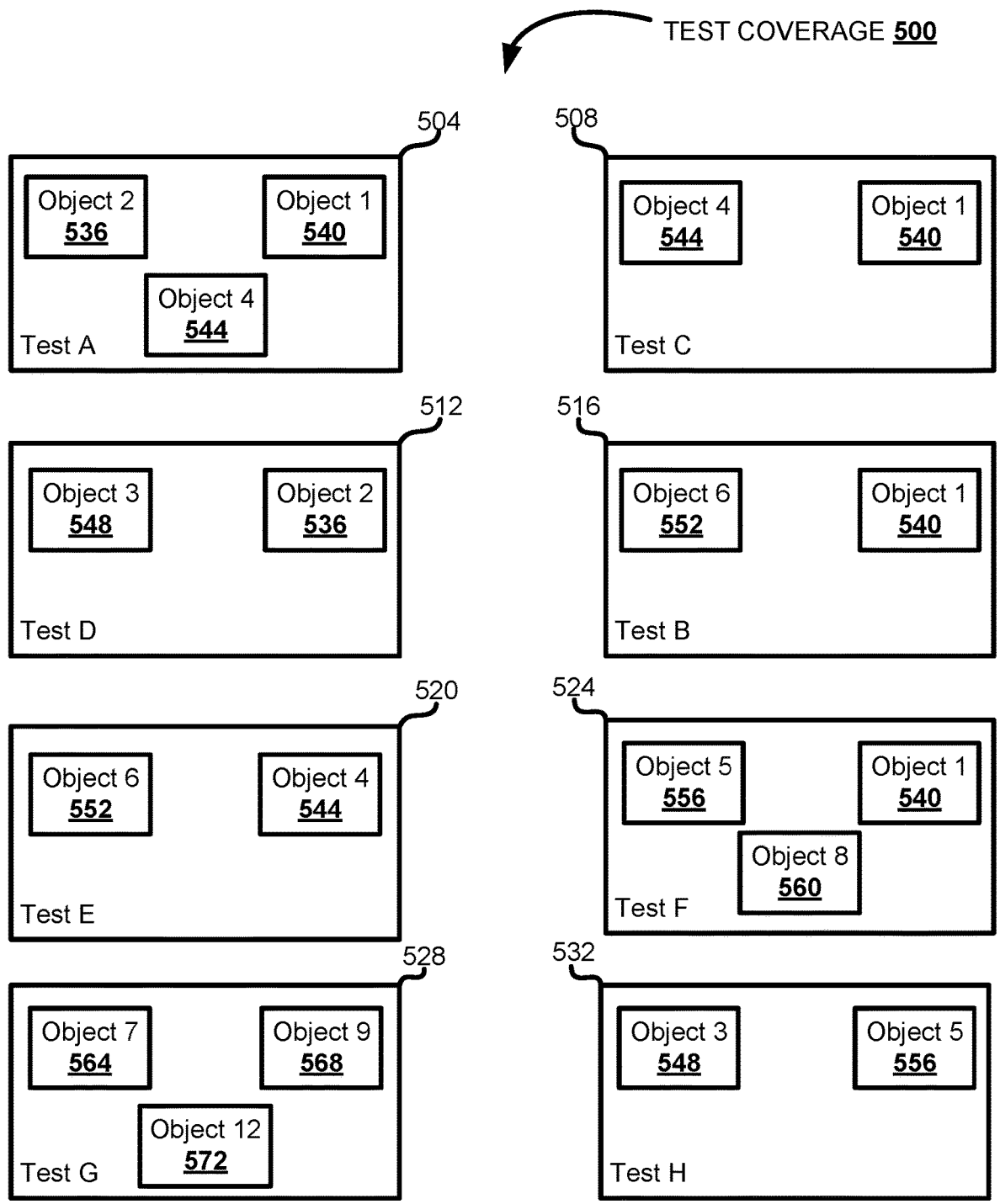
FIG. 5 illustrates an exemplary block diagram describing a test coverage record.

FIG. 5 describes an exemplary block diagram 500 of test case coverage. Test coverage may identify one or more objects that may be tested by a test case. In some examples, test cases may be generated based on test coverage. For example, a development device may determine that a test case does not test object 1, object 5, and object 8. The development device may generate a new test case that tests the three objects. In some examples, test cases may be generated by a combination of test coverage and other factors. For example, one or more objects of a potentially unwanted modification may be covered by a previously test cases and one or more other objects may not be covered by any of the previously generated or executed test cases. A development device may use test coverage to automatically identify test cases to test the one or more other objects. The development device may use one or more other factors in test generation to preserve the efficiency of testing. In that example, a test case may be generated using redundancy as an additional factor such that object 1 and object 5, may be tested by a first test case and object 1, object 5, object 8 by a second test cases causing object 1 and object 5 to be tested twice.

A database of test records may be used to determine the test coverage of one or more test cases when the test coverage is unknown. Test records maintain an association between a potentially unwanted modification, objects included in that modification, and the test cases that were executed to test that modification. The test records may be correlated to determine a test coverage of one or more test cases. For example, test case A 504 may have been used to test a potentially unwanted modification that included objects 1 (540), object 4 (544), object 5 (556), and object 7 (564). Test A may also have been executed to test a potentially unwanted modification including objects 1 (540), object 4 (544), and object 12 (572). Correlating the test records may infer that the coverage of test case A 504 includes object 1 (540) and object 4 (544). The greater the number of test records the more data may be used to get an accurate test coverage determination.

Test coverage may also be determined by an instruction level analysis of test cases and corresponding objects. For example, source code analysis (and/or object code, machine code, assembly, or the like) may be used to determine particular portions of objects that are tested by a test case. For example, an object may include two fields and two functions. A review of the source code of the object may identify that a test case tests the values that may be stored in the two fields and tests the inputs/outputs of the two functions. In that example, the test case may be determined as affirmatively testing that object. In some cases, a test case may test a portion of an object (e.g., just the two functions in the preceding example). In those cases, test coverage may be used to indicate a test case that tests an object even if the test case does not cover the entirety of the object. In some examples, if a first test case does not cover an entire object then one or more other test cases that also test the object or test the portion of the object not tested by the first test case may be linked to the first test case. In some examples, linked test cases may be executed together to ensure that the entirety of an object is tested. In other examples, when a test case is scheduled to test a portion of an object, an alert may be triggered causing one or more additional test cases to be scheduled (manually or automatically) to cover the deficiency.

The exemplary block diagram 500 depicts exemplary coverage of the exemplary test cases 504-532. Test case may cover zero or more objects. Test cases that do not cover any objects may cover other aspect of the software build. For example, a test case may cover non-object-oriented aspects of a software build. Although not shown, test cases that cover non-object portions of a software build may include an attribute or identifier indicating the portions of the software build covered by the test case (e.g., particular instructions, lines of code, scripts, configuration settings, etc.). For example, a test case may be marked as testing a compiler configuration file that indicates how the software build is to be compiled.

Test cases may include test coverage covering unique objects sets, overlapping object sets, or identical object sets. In some examples, test cases may be generated to cover a unique set of objects not tested by other test cases. By executing test cases that cover unique object sets, fewer test cases may be used to verify that a software build is operational. In some examples, test cases may be permitted to test overlapping object sets. Test cases may be generated such that one or more of the objects covered by a test case may also be covered my one or more other test cases. For example, test case A 504, test case B 508, test case C 516, and test case F 524, cover object 1 (540) among various other objects. In other examples, two or more test cases may have an identical object coverage. For example, a first test case may determine if an expected output occurs given a particular input while a second test case may test exception handling. The first test case and the second test case may cover the same set of objects providing a different form of verification. Tests with identical coverage may also improve redundant testing to increase the accuracy of testing. In still yet other examples, test cases with identical coverage may not be permitted, so as to reduce or eliminate duplicative or redundant testing that merely adds to the processing costs of software build testing.

Figure 6:
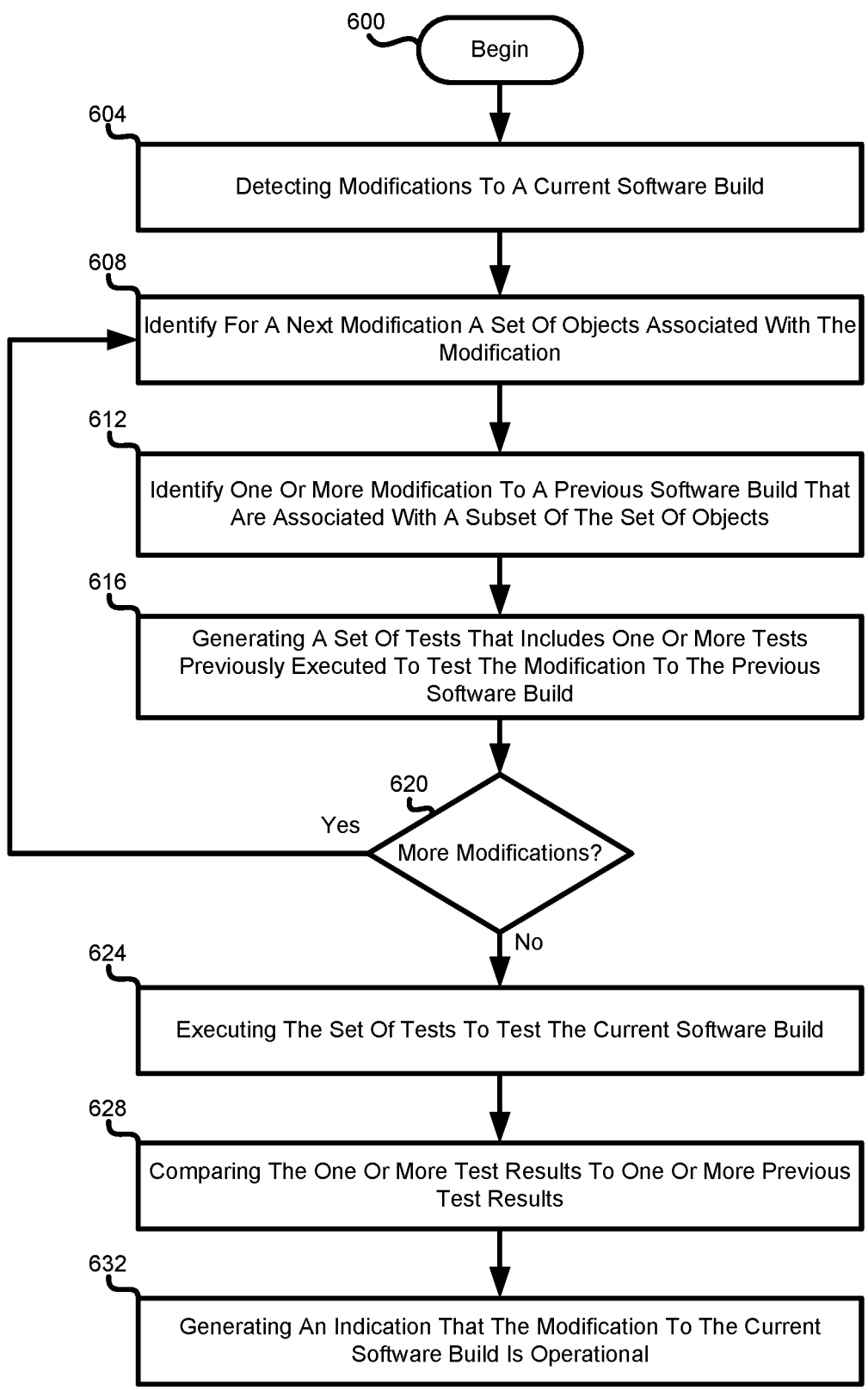
FIG. 6 illustrates and exemplary flowchart for providing object-oriented regression-candidate filtering.

FIG. 6 illustrates and exemplary flowchart of a process 600 for implementing object-oriented regression-candidate filtering. Object-oriented software development is an iterative process in which objects are defined and assembled in a logical structure to form a software build. The software build may be tested before being distributed to one or more client devices (e.g., users). The modifications may be potentially unwanted modifications that may coincided with detected undesirable functionality (e.g., network or processing latency, etc.), faults (e.g., handled or unhandled interrupts or exceptions, build crashes, system crashes, data loss, etc.), or inaccurate execution (e.g., unexpected output) in the software build. Testing may identify the particular potentially unwanted modification that is the root cause by testing the particular objects associated with the modification (i.e., the objects modified by the potentially unwanted modification).

Accordingly, process 600 starts at block 604 in which one or more modifications to a current software build may be detected. For example, one or more modifications may include modifications to a previous software build that transformed the previous software build into the current software build. The modification may include added, removed, and/or modified portions of the software build such as features, lines of code, source code files, objects, and/or the like. In some examples, a modification may include one or more other modifications. For example, a modification to a feature may include another modification to a related or dependent feature. In those examples, the modifications may be treated as a single modification. In other examples, modifications may be defined in smaller parts. For example, a larger modification may be defined as multiple smaller modifications based on one or more attributes of the larger modifications (e.g., number or types of objects involved, logical differences, dependencies, etc.).

At block 608, a first modification of the one or more modifications may be selected. In some examples, a modification that is likely to be the cause may be selected as the first modification. For example, if the particular fault occurs during processing a connection request from a remote device, a modification associated defining the connection protocols may be selected over a modification associated with a word processing feature. In some examples, the largest modification may be selected as the first modification. For example, a modification associated with a main function (i.e. main function of the call stack) may be selected over a modification to a field of an object. In some examples, the first modification is selected at random, automatically, manually, or by any other means. A set of current objects may be determined based on the objects modified by the modification to the current software build. The set of current objects may be used to identify similar modifications to previous software builds and/or test cases that may be executed to test the modification to the current software build.

At block 612, a regression analysis may be performed by analyzing the particular modification selected in 608 and identifying related modifications in one or more previous software builds. For example, if the modification selected at 608 related to the word processing features, then block 612 would identify one or more modifications to a previous software build related to the word processing features. In some examples, the regression may identify the earliest version in which a particular modification was made to determine where certain features, objects, and or faults may have been introduced. For example, if the modification to the current software build related to word processing, the regression analysis may identify the earliest software build in which a word processor (or feature thereof) was added to the software build.

The regression analysis may use an object analysis to identifying modifications to a previous software build that include one or more objects that are included in the modification to the current software build. For example, if the modification to the current software build includes a first set of objects, the regression analysis will identify modifications to one or more previous software builds that include a subset of the first set of objects. The first set of objects may include an incremented version of the objects included in the a subset of the first set of objects. In some examples, the regression analysis will analyze the most recent previous software build first and continue to the next most recent until at least one matching modification is found. In some examples, the regression analysis will start at an earliest build (e.g., version 1.0) and work to the next earliest until at least one matching modification is identified. In still yet other examples, the regression analysis may identify the modification in the software build having the greatest number of matching objects with the modification to the current software build.

In some examples, other factors for selecting a modification to a previous software build may be used. For example, the regression analysis may identify the one or more modification to a previous software build based on particular a fault. For example, a previous software build that did not include the fault may be identified. A modification associated with this build may then be compared to the current modification to identify a cause of a fault. In some examples, the oldest software build that included a particular fault may be identified and used to determine when (and possibly the cause of) a particular fault was introduced to the software build.

Once the one or more modifications to the one or more previous software builds are identified, a set of previous objects associated with the one or more modifications is determined. The set of previous objects may be objects that have been modified by the one or more modifications to the one or more previous software build. The set of previous objects may be compared to the set of current objects to identify objects in the set of current objects that are associated with a previous modification. In some examples, the set of previous objects may be pruned such that any object in set of previous objects that is not also in the set of current objects may be discarded. In some examples, after discarding the objects in the set of previous objects that were not also in the set of current objects, the set of current objects may be pruned such that objects that are also in the set of previous objects may be removed. As a result, the set of current objects will become the set of new objects by including those objects that were not in the one or more modifications to the one or more previous software build. In addition, the set of previous objects will become the set of common objects by including those objects that were common to the modification to the current software build and the one or more modifications to the one or more previous software builds. For example, object A, object B, and object C, may be included in the modification to the current software build and object B and object C may be included in a modification to a previous software build. The set of new objects may include just object A and the set of common objects may include object B and object C.

At block 616, a set of tests may be scheduled to test the modification to the current software build. A regression-candidate filter may be used to identify one or more test cases that were executed to test the one or more previous software builds that can be executed to test the current software build. For example, object A, object B, and object C, may be included in the modification to the current software build and object B and object C may be included in a modification to a previous software build. The regression-candidate filter may identify the test cases that were executed to test a modification to the previous software build and filter the candidates (i.e., the test cases) to identify those test cases that tested object B and object C. These test cases may be added to the set of tests to test object B and object C of the modification to the current software build.

In some cases, the regression-candidate filtering may identify test cases that have been previously executed to test objects of the modification to the current software build. In those cases, the identified test cases may be added to the set of test cases and scheduled for execution to test the modification to the current software build. In other examples, the regression-candidate filtering may identify test cases that test a portion of the modification to the current software build. In those cases, coverage analysis may be performed to identify the portions of the modification to the current software build not tested by the set of test cases and one or more new test cases may be obtained for the portions of the modification to the current software build not tested. For example, one or more additional test cases may be generated (automatically or manually) to test the untested portions. In other cases, one or more previously generated test cases (e.g., executed to test a portion of the one or more previous software builds) may be executed if those test cases may test the missing portions. In still yet other cases, the one or more previously generated test cases may be modified to test the missing portions if it is determined that the one or more previously generated test cases will be capable of testing the missing portions after having been modified. The set of test cases may be appended with additional test cases to test objects not tested by the set of test cases.

At block 620, it is determined whether there are more modifications to the current software build. In some examples, the testing a software build may occur iteratively in which test cases are identified for a first modification and executed to test the first modification before moving on to a second or subsequent modification. In other examples, test cases are added to the set of tests until the remaining modifications have been analyzed. Then the set of test cases are executed to test the modifications at once. Upon determining that there are modifications remaining, the process returns to block 608 where a next modification is selected and blocks 612 an 620 repeat to identify previously executed test cases that may be re-executed to test objects of the next modifications. These test cases may be added to the set of test cases.

If it is determined there are no more modifications to analyze, the process continues to block 624 in which the set of test cases are scheduled for execution. In some examples, tests are automatically executed in a predefined order. In some examples, test cases may be ordered such that modifications may be tested in a particular order (i.e. test cases associated with a first modification may be executed before test cases associated with a second modification) or objects may be tested in a particular order. In some examples, test cases may be ordered based on the test coverage (e.g., test cases covering the largest number of objects may be executed first or vice versa), likelihood of identifying objects associated with faults, amount of processing resources available, amount of processing resource used to execute a test case, execution time, and/or the like. In still yet other examples, test cases may be ordered randomly or manually. In addition, test cases may be automatically scheduled for execution at a particular time (based on processing resources, execution time, etc.) or manually.

At block 628, the results of executing the set of tests may be analyzed to verify the operation of the current software build, the modification, and/or the objects of the modifications. In some examples, the results may be compared to an expected result. For example, a test case may test the operation of a function that produces a particular output from a given input. The test case may simulate a plurality of inputs and record the resulting outputs. The outputs may be compared to the expected output to determine whether the function operates as expected. In other examples, the results may be compared to previous results obtained from previous executions of the set of tests. For example, the set of tests may include test cases executed to test a previous software build. The results of those tests may be compared to the results from executing those tests on the current software build to determine if a deviation has occurred. Comparing current results to past results may provide an indication that a new fault has been detected (e.g., new results differ from past acceptable results) or that an old fault has been corrected (e.g., past results indicated a fault and new results are expected). In other examples, the results of executing may be a Boolean result (e.g., pass or fail) and such that the results need not be compared to determine an operational status of the current software build.

At block 632, an indication of testing success or failure is generated. In some examples, testing success (e.g., software build is operational and without detected faults) may be determined if the set of test cases do not identify a software fault. In other examples, testing success may be determined if a percentage of the test cases are successful (e.g., where the percentage may be automatically or manually determined). The outcome of testing may be reported to one or more devices (such as device 104 of FIG. 1) via a graphical user interface. In some examples, testing success may automatically trigger the application to be packaged and transmitted to one or more client devices (or a patch if client devices already have the previous version of the software build). A testing failure may automatically provide an indication as to the root cause (e.g., particular modification and/or objects) of a detected fault or testing failure. For example, upon detecting a testing failure, the identifiers of the objects associated with the modification causing the fault may be automatically transmitted to a development device. The development device may retrieve the corresponding source code files and display the sections of the source code (or objects) that caused a fault. The development devices may then fix the fault (e.g., modification) and retest (e.g., by returning to block 604). Once testing is complete the process may return to step 604 waiting to detect another modification or terminate.

Executing the test cases may provide verification that a particular potentially unwanted modification works as expected (i.e. may no longer be "potentially unwanted" and simply a modification). These modifications may be accepted and become a permanent aspect of the current software build. The test cases may also identify objects of a potentially unwanted modifications that may be a cause of faults. In some examples, the potentially unwanted modification may be removed from the current software build to prevent the faults. In some examples, if a fault is not severe (e.g., minor or otherwise acceptable network latency) then the potentially unwanted modification may be preserved in the current software build despite the undesirable functionality.

In still yet other examples, detecting faults may cause other remedial action to be taken. For example, based on the particular potentially unwanted modification, it may be possible to correct the revert a particular modified object to its previous version. Alternatively, it may be possible to replace a modified object with a different object that may provide similar functionality (e.g., similar fields and/or functions). Accordingly, the particular modified object(s) that may be the root cause of the faults may be isolated and replaced with a version of the object (and/or a different object) that has been previously verified to operate as intended. Once the test cases have been executed and a potentially unwanted modification resolved, software build may be considered verified and pushed to one or more client devices for use.

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system comprising:
one or more processors;
a non-transitory computer-readable media including executable instructions which when executed by the one or more processors, cause the one or more processors to perform operations including:
   detecting a first fault upon testing a current software build, the first fault being associated with a first fault identifier;
   detecting a modification to the current software build, the current software build including a plurality of objects;
   identifying a set of objects of the plurality of objects of the current software build that are affected by the modification to the current software build;
   identifying a second fault identifier that is associated with the first fault identifier, the second fault identifier corresponding to a previous fault detected during testing of a previous software build;
   identifying, in response to identifying the second fault identifier, a modification to the previous software build associated with the previous fault, wherein the modification to the previous software build affected a subset of the set of objects;
   identifying, from the subset of the set of objects, a first object that was tested during the testing of the previous software build and is associated with the previous fault;
   retrieving a plurality of tests that were previously executed to test the modification to the previous software build;
   determining, from a test record, that a particular test of the plurality of tests output a result that did not indicate whether the first object is a cause of the previous fault;
   generating an updated test record such that the updated test record includes (i) an indication of a set of tests, (ii) an indication of the subset of the set of objects, and (iii) the modification to the current software build, wherein the updated test record associates the set of tests and the subset of the set of objects to the modification to the current software build;
   adjusting the updated test record to reflect that the particular test outputs a result that does not indicate whether the first object is a cause of the previous fault;
   determining, in response to determining that the particular test output the result that did not indicate whether the first object is the cause of the previous fault, not to use the particular test to test the first object in a subsequent testing run;
   generating the set of tests that includes the plurality of tests that were previously executed to test the modification to the previous software build except for the particular test, the set of tests configured to test the subset of the set of objects that were affected by the modification to the current software build;
   scheduling an execution order for the subsequent testing run that includes each test of the set of tests such that a first test that tests the first object is configured to be executed before a second test that tests another object of the subset of the set of objects;
   executing the set of tests to test the current software build, wherein the set of test are executed according to the execution order, and wherein executing the set of tests generates one or more test results;
   in response to determining that a particular test of the set of tests fails, automatically transmitting a root cause to a development device, wherein the root cause includes one or more identifiers of one or more objects associated with the modification to the current software build that caused the particular test of the set of tests to fail, wherein the system is configured to automatically trigger an application to be packaged and transmitted to one or more client devices if the set of tests had succeeded;
   comparing the one or more test results to one or more previous test results; and
   modifying, based on comparing the one or more test results to the one or more previous test results, the current software build to remove the modification to the current software build.

2. The system of claim 1, wherein the current software build includes an incremented version of one or more objects of the previous software build.

3. The system of claim 1, wherein the operations further comprise:
   determining whether each object of the subset of the set of objects has been previously tested; and
   generating one or more new tests for each object that have not been tested.

4. The system of claim 1, wherein generating the set of tests further comprises:
   determining a coverage for each test of the plurality of tests, the coverage indicating an amount of the current software build that is tested; and
   selecting one or more tests of the plurality of tests to be included in the set of tests based on the coverage.

5. The system of claim 1, wherein generating the set of tests includes querying the test record, wherein the test record links the modification to the previous software build to each object of the previous software build affected by the modification and to an identification of the particular test executed to test the modification to the previous software build.

6. The system of claim 1, wherein detecting the modification to the current software build is in response to detecting one or more faults in the current software build.

7. The system of claim 1, wherein the operations further include:
   determining a coverage for each test of the plurality of tests, the coverage indicating an amount of the current software build that is tested;
   determining that a combined coverage of each test of the set of tests does not cover each object of the subset of the set of objects;
   generating, based on determining that the combined coverage of each test of the set of tests does not cover each object of the subset of the set of objects, one or more additional tests configured to test one or more objects of the subset of the set of objects not covered by the set of tests; and
   scheduling the one or more additional tests for execution.

8. The system of claim 1, wherein an object in the set of objects includes one or more fields and one or more functions, wherein a plurality of test records includes the test record and one or more other test records, wherein the plurality of test records includes a structure of a doubly-linked list that links the modification to the current software build to the modification to the previous software build, wherein the doubly-linked list includes nodes corresponding to the plurality of test records, and wherein the doubly-linked list is configured to provide, in response to a query, one or more tests used to test the modification to the previous software build.

9. The system of claim 8, wherein:
the operation of retrieving the plurality of tests that were previously executed to test the modification to the previous software build comprises retrieving, from the test record, the plurality of tests; and
the operation of generating an updated test record comprises adjusting the test record to associate the set of tests and the subset of the set of objects to the modification to the current software build, wherein the adjusted test record is the updated test record.

10. A method comprising:
detecting a first fault upon testing a current software build, the first fault being associated with a first fault identifier;
detecting a modification to the current software build, the current software build including a plurality of objects;
identifying a set of objects of the plurality of objects of the current software build that are affected by the modification to the current software build;
identifying a second fault identifier that is associated with the first fault identifier, the second fault identifier corresponding to a previous fault detected during testing of a previous software build;
identifying, in response to identifying the second fault identifier, a modification to the previous software build associated with the previous fault, wherein the modification to the previous software build affected a subset of the set of objects;
identifying, from the subset of the set of objects, a first object that was tested during the testing of the previous software build and is associated with the previous fault;
retrieving a plurality of tests that were previously executed to test the modification to the previous software build;
determining, from a test record, that a particular test of the plurality of tests output a result that did not indicate whether the first object is a cause of the previous fault;
generating an updated test record such that the updated test record includes (i) an indication of a set of tests, (ii) an indication of the subset of the set of objects, and (iii) the modification to the current software build, wherein the updated test record associates the set of tests and the subset of the set of objects to the modification to the current software build;
adjusting the updated test record to reflect that the particular test outputs a result that does not indicate whether the first object is a cause of the previous fault;
determining, in response to determining that the particular test of the plurality of tests output the result that did not indicate whether the first object is the cause of the previous fault, not to use the particular test to test the first object in a subsequent testing run;
generating the set of tests that includes the plurality of tests that were previously executed to test the modification to the previous software build except for the particular test, the set of tests configured to test the subset of the set of objects that were affected by the modification to the current software build;
scheduling an execution order for the subsequent testing run that includes each test of the set of tests such that a first test that tests the first object is configured to be executed before a second test that tests another object of the subset of the set of objects;
executing the set of tests to test the current software build, wherein the set of test are executed according to the execution order, and wherein executing the set of tests generates one or more test results;
in response to determining that a particular test of the set of tests fails, automatically transmitting a root cause to a development device, wherein the root cause includes one or more identifiers of one or more objects associated with the modification to the current software build that caused the particular test of the set of tests to fail, wherein an application is configured to be automatically triggered to be packaged and transmitted to one or more client devices if the set of tests had succeeded;
comparing the one or more test results to one or more previous test results; and
modifying, based on comparing the one or more test results to the one or more previous test results, the current software build to remove the modification to the current software build.

11. The method of claim 10, wherein one or more modifications to the previous software build transformed previous software build into the current software build, the one or more modifications affecting one or more objects of the previous software build, and wherein the current software build includes an incremented version of the one or more objects of the previous software build.

12. The method of claim 10, further comprising:
determining whether each object of the subset of the set of objects has been previously tested; and
generating one or more new tests for each object that have not been tested.

13. The method of claim 10, wherein generating the set of tests further comprises:
determining a coverage for each test of the plurality of tests, the coverage indicating an amount of the current software build that is tested; and
selecting one or more tests of the plurality of tests to be included in the set of tests based on the coverage.

14. The method of claim 10, wherein detecting the modification to the current software build is in response to detecting one or more faults in the current software build.

15. The method of claim 10, further comprising:
determining a coverage for each test of the plurality of tests, the coverage indicating an amount of the current software build that is tested;
determining that a combined coverage of each test of the set of tests does not cover each object of the subset of the set of objects;
generating, based on determining that the combined coverage of each test of the set of tests does not cover each object of the subset of the set of objects, one or more additional tests configured to test one or more objects of the subset of the set of objects not covered by the set of tests; and
scheduling the one or more additional tests for execution.

16. A non-transitory computer-readable media including executable instructions which when executed by one or more processors, cause the one or more processors to perform operations including:
detecting a first fault upon testing a current software build, the first fault being associated with a first fault identifier;
detecting a modification to the current software build, the current software build including a plurality of objects;

identifying a set of objects of the plurality of objects of the current software build that are affected by the modification to the current software build;

identifying a second fault identifier associated with the first fault identifier, the second fault identifier corresponding to a previous fault detected during testing of a previous software build;

identifying, in response to identifying the second fault identifier, a modification to the previous software build associated with the previous fault, wherein the modification to the previous software build affected that affected a subset of the set of objects;

identifying, from the subset of the set of objects, a first object that was tested during the testing of the previous software build and is associated with the previous fault;

retrieving a plurality of tests that were previously executed to test the modification to the previous software build;

determining, from a test record, that a particular test of the plurality of tests output a result that did not indicate whether the first object is a cause of the previous fault;

generating an updated test record such that the updated test record includes (i) an indication of a set of tests, (ii) an indication of the subset of the set of objects, and (iii) the modification to the current software build, wherein the updated test record associates the set of tests and the subset of the set of objects to the modification to the current software build;

adjusting the updated test record to reflect that the particular test outputs a result that does not indicate whether the first object is a cause of the previous fault;

determining, in response to determining that the particular test of the plurality of tests output the result that did not indicate whether the first object is the cause of the previous fault, not to use the particular test to test the first object in a subsequent testing run;

generating the set of tests that includes the plurality of tests that were previously executed to test the modification to the previous software build except for the particular test, the set of tests configured to test the subset of the set of objects that were affected by the modification to the current software build;

scheduling an execution order for the subsequent testing run that includes each test of the set of tests such that a first test that tests the first object is configured to be executed before a second test that tests another object of the subset of the set of objects;

executing the set of tests to test the current software build, wherein the set of test are executed according to the execution order, and wherein executing the set of tests generates one or more test results;

in response to determining that a particular test of the set of tests fails, automatically transmitting a root cause to a development device, wherein the root cause includes one or more identifiers of one or more objects associated with the modification to the current software build that caused the particular test of the set of tests to fail, wherein the instructions are configured to automatically trigger an application to be packaged and transmitted to one or more client devices if the set of tests had succeeded;

comparing the one or more test results to one or more previous test results; and modifying, based on comparing the one or more test results to the one or more previous test results, the current software build to remove the modification to the current software build.

17. The non-transitory computer-readable media of claim 16, wherein one or more modifications to the previous software build transformed the previous software build into the current software build, the one or more modifications affecting one or more objects of the previous software build, and wherein the current software build includes an incremented version of the one or more objects of the previous software build.

18. The non-transitory computer-readable media of claim 15, wherein the operations further comprise:
   determining whether each object of the subset has been previously tested; and
   generating one or more new tests for each object that have not been tested.

19. The non-transitory computer-readable media of claim 16, wherein generating the set of tests further comprises:
   determining a coverage for each test of the plurality of tests, the coverage indicating an amount of the current software build that is tested; and
   selecting one or more tests of the plurality of tests to be included in the set of tests based on the coverage.

20. The non-transitory computer-readable media of claim 16, wherein the operations further include:
   determining a coverage for each test of the plurality of tests, the coverage indicating an amount of the current software build that is tested;
   determining that a combined coverage of each test of the set of tests does not cover each object of the subset of the set of objects;
   generating, based on determining that the combined coverage of each test of the set of tests does not cover each object of the subset of the set of objects, one or more additional tests configured to test one or more objects of the subset of the set of objects not covered by the set of tests; and
   scheduling the one or more additional tests for execution.

* * * * *

UNITED STATES PATENT AND TRADEMARK OFFICE
CERTIFICATE OF CORRECTION

| | | |
|---|---|---|
| PATENT NO. | : 11,748,245 B2 | |
| APPLICATION NO. | : 16/047668 | |
| DATED | : September 5, 2023 | |
| INVENTOR(S) | : He | |

It is certified that error appears in the above-identified patent and that said Letters Patent is hereby corrected as shown below:

In the Specification

In Column 7, Line 65, delete "the a" and insert -- the --, therefor.

In Column 15, Line 64, delete "that that" and insert -- that --, therefor.

In Column 18, Line 26, delete "and or" and insert -- and/or --, therefor.

In Column 18, Line 40, delete "the a" and insert -- the --, therefor.

In the Claims

In Column 28, Line 25, in Claim 18, delete "15," and insert -- 16, --, therefor.

Signed and Sealed this
Eighteenth Day of June, 2024

Katherine Kelly Vidal
*Director of the United States Patent and Trademark Office*